United States Patent
Fey

(10) Patent No.: US 6,703,802 B2
(45) Date of Patent: Mar. 9, 2004

(54) SATURATION SUPPRESSION OF CRT OUTPUT AMPLIFIERS

(75) Inventor: Bernd Fey, Villingen-Schwenningen (DE)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 10/262,790

(22) Filed: Oct. 2, 2002

(65) Prior Publication Data

US 2003/0067272 A1 Apr. 10, 2003

(30) Foreign Application Priority Data

Oct. 10, 2001 (EP) .............................................. 01124111

(51) Int. Cl.$^7$ .............................. G09G 1/04; H04N 5/14
(52) U.S. Cl. .................... 315/403; 315/382.1; 315/383; 315/400; 348/707; 348/708
(58) Field of Search ................................. 315/403, 404, 315/407, 382.1, 399, 383, 382, 400; 348/645, 643, 644, 914, 248, 300, 242, 707, 708, 709

(56) References Cited

U.S. PATENT DOCUMENTS

| | | | | |
|---|---|---|---|---|
| 4,298,885 A | * | 11/1981 | Okada | ........................ 348/679 |
| 5,455,635 A | * | 10/1995 | Keller | ........................ 348/674 |
| 6,057,883 A | * | 5/2000 | Fey et al. | .................... 348/377 |
| 6,295,098 B1 | * | 9/2001 | Motonakano et al. | ....... 348/675 |

FOREIGN PATENT DOCUMENTS

JP          3-71784        *  3/1991

OTHER PUBLICATIONS

Patent Abstracts of Japan vol. 015, No. 236 (E–1078) Jun. 18, 1991 & JP 03 071784 A (Hitachi LTD; Others: 01), Mar. 27, 1991.
Patent Abstracts of Japan vol. 004, No. 048 (E–006), Apr. 12, 198 & JP 55 020051A (Iwatsu Electric Co. Ltd.) Feb. 13, 1980.

* cited by examiner

*Primary Examiner*—Tuyet T. Vo
(74) *Attorney, Agent, or Firm*—Joseph S. Tripoli; Robert D. Shedd; William A. Lagoni

(57) ABSTRACT

The invention provides a circuit for controlling a cathode ray tube. The circuit comprises a source of input color signals ($U_{in}(R)$, $U_{in}(G)$, $U_{in}(B)$) for the primary colors of the cathode ray tube. Output amplifiers are coupled to the source of color input signals and to electron guns of the cathode ray tube. Finally, limiting means are provided to limit the color input signals to a predetermined threshold value. In this way the output amplifiers are prevented from saturation and undesirable smears do not appear on the screen. In an advantageous embodiment the limiting means are realized by a diode biased in reverse direction.

12 Claims, 3 Drawing Sheets

SATURATION SUPPRESSION OF CRT OUTPUT AMPLIFIERS

FIELD OF THE INVENTION

The invention relates to a circuit for controlling a cathode ray tube (CRT) and a television receiver equipped with such a circuit. A further aspect of the invention is related to control the driving signals for a CRT.

BACKGROUND OF THE INVENTION

For a television receiver the maximum brightness, which can be represented on the viewing screen of the CRT or picture tube, the so-called light at peak white is an important quality characteristic of the image reproduction. In practice, the light at peak white is essentially limited firstly, by the control range or the saturation limit of the RGB output stages controlling the picture tube and, secondly, by the maximum permissible drive of the picture tube.

In order to achieve the highest possible brightness, it is therefore necessary to set the drive of the picture tube, that is to say the amplification of the RGB signals controlling the picture tube, as high as possible in the direction of white.

However, when the video output stages are driven in this way they may occasionally reach the saturation limit of the amplifiers in the output stages. Substantial tolerances such as, for example, the cut-off calibration, the transparency of the picture tube glass and fluctuations in the input signal, the dark current regulation compensating the ageing of the picture tube as well as customer settings such as brightness, contrast and colour saturation are responsible for exceeding the saturation limit.

If an amplifier of a video output stage reaches the saturation limit, so-called smears appear on the viewing screen in the corresponding colour in the form of an extension of a pixel or of an image area in the line direction. These smears occur primarily for the colour red, because the electron gun for the colour red of the picture tube requires the highest drive because the red phosphor is least sensitive.

In order to avoid such saturation phenomena in the case mentioned where tolerances sum up in an unfavourable way, it would therefore be necessary to observe a certain safety distance towards full output of the output amplifiers. However, this means in turn that the theoretically maximum possible drive to full output is generally not reached. Consequently, it is not possible to reach the maximum brightness of the picture tube.

U.S. Pat. No. 6,057,887 suggests a circuit to alleviate the problems described above. In the known circuit the output colour signals are limited by Zener diodes to a threshold value that avoids the occurrence of smears on the screen. However, in practice it has been noted that the use of the known circuit in connection with the video amplifier IC TEA 5101 manufactured by ST has led to enhanced smearing effects due to "latching" effects inside the video amplifier IC.

SUMMARY OF INVENTION

Based on these observations it is desirable to provide a circuit, which reliably avoids all the described smears.

The invention provides a circuit for controlling a cathode ray tube comprising a source of input colour signals ($U_{in}(R)$, $U_{in}(G)$, $U_{in}(B)$) for the primary colours of the cathode ray tube. Output amplifiers are coupled to the source of colour input signals and to electron guns of the cathode ray tube. Finally, limiting means are provided to limit the colour input signals to a predetermined threshold value.

In an advantageous embodiment of the inventive circuit the limiting means comprise a diode biased in reverse direction. Preferably a voltage source provides the bias voltage of the diode. The voltage source may be realized by a voltage divider stabilized with a Zener diode.

In a preferred embodiment of the invention the same voltage source utilized to provide a reference voltage ($U_{ref}$) for the output amplifier is also utilized to provide the biasing voltage for the diode.

It is advantageous to connect the limiting means to a transistor providing a low impedance voltage source in case the input signal exceeds the threshold voltage.

Further advantages of the invention become apparent when reading the detailed description of the embodiments of the invention.

BRIEF DESCRIPTION OF THE DRAWINGS

In the drawing exemplary embodiments of the present invention are shown. Corresponding elements in the drawing are designated with corresponding reference symbols. It shows.

DETAILED DESCRIPTION OF THE PREFERRED EMBODIMENTS

Figure 1:
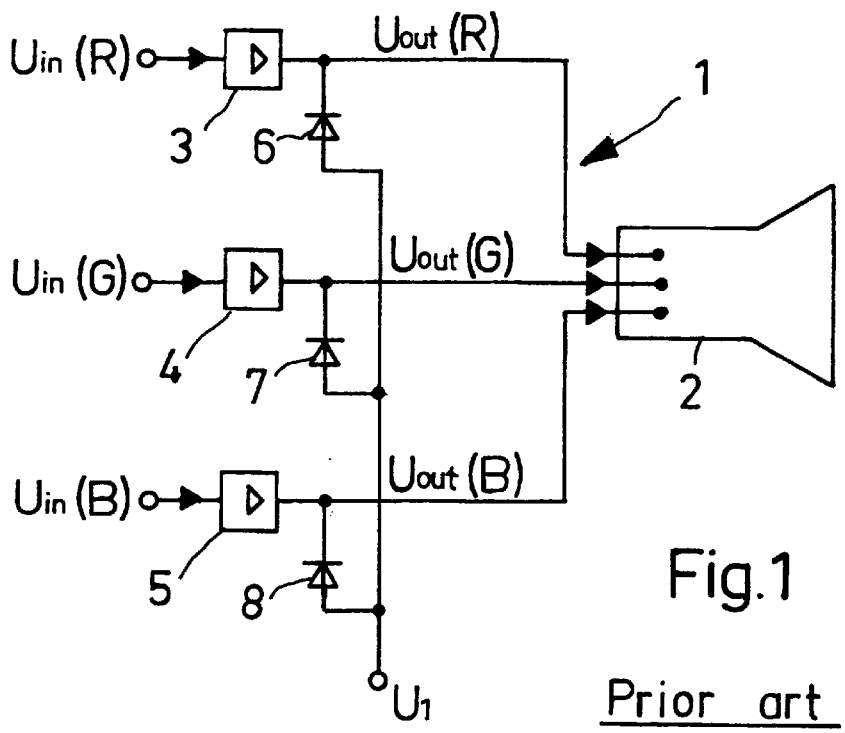
FIG. 1 a circuit for controlling a cathode ray tube according to the prior art.

FIG. 1 shows a circuit for controlling a CRT as it is known from U.S. Pat. No. 6,057,883. The known circuit, which is designated as a whole with the reference symbol 1 has three outputs connected to the electron guns of a CRT 2. Each output of the control circuit 1 is associated with a video amplifier 3, 4, 5 for each of the primary colours red, green and blue. The amplifiers 3, 4, 5 receive colour input signals $U_{in}(R)$, $U_{in}(G)$, $U_{in}(B)$ to generate colour output signals $U_{out}(R)$ $U_{out}(G)$, $U_{out}(B)$.

The outputs of the amplifiers are each connected to the cathode of a diode 6, 7, 8, respectively. The diodes are biased in forward direction by an external voltage $U_1$. Thus, the colour output signals $U_{out}(R)$, $U_{out}(G)$, $U_{out}(B)$ are prevented from falling below the external voltage $U_1$. In this way the known circuit avoids smears as described in the introduction.

Figure 2:
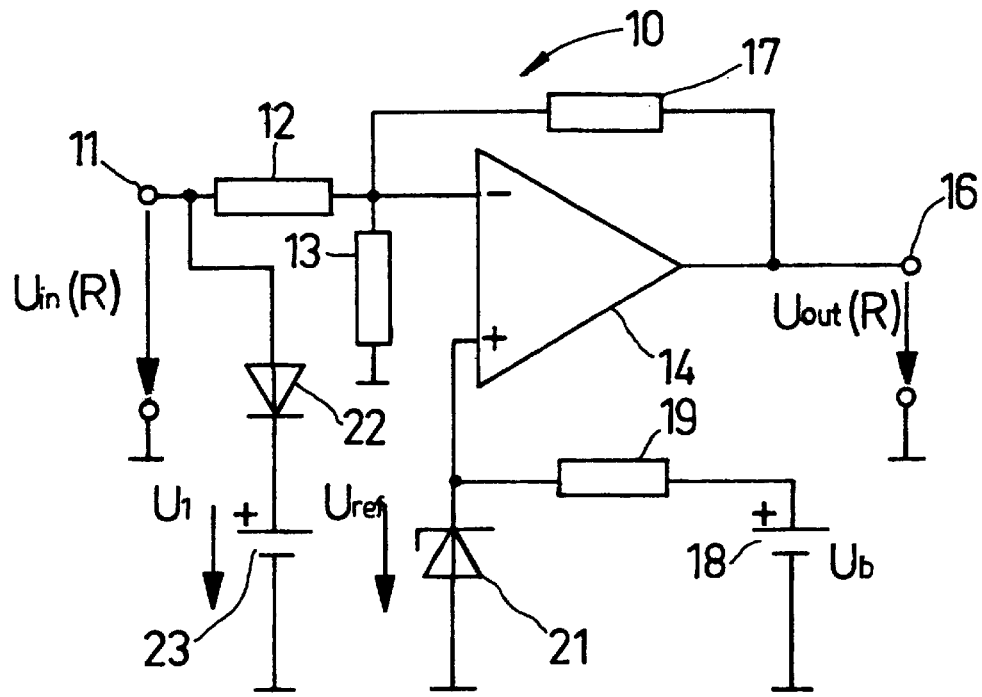
FIG. 2 a schematic circuit diagram of a first embodiment of the inventive circuit.

FIG. 2 displays an embodiment of the inventive circuit. For the sake of simplicity only the circuit for the primary colour red is shown, because the circuits for the other two primary colours are identical as to the extent it is relevant for the present invention. The circuit designated as a whole with the reference symbol 10 performs the amplification of a colour input signal $U_{in}(R)$ to generate a colour output signal $U_{out}(R)$. This is similar to the function of the amplifier 3 shown in FIG. 1.

The circuit 10 receives at input terminal 11 the colour input signal $U_{in}(R)$, which is coupled via a voltage divider composed of resistors 12 and 13 to the inverting input of amplifier 14. The amplifier generates the colour output signal $U_{out}(R)$ supplied to the output terminal 16 and coupled back by resistor 17 to the inverting input of the amplifier 14. The non-inverting input of the amplifier 14 is supplied with a reference voltage $U_{ref}$. The reference voltage $U_{ref}$ is supplied and stabilized by a series connection of a first voltage source 18, resistor 19 and Zener diode 21. In a specific embodiment the first voltage source 18 provides essentially 12 V and the reference voltage is essentially equal to 3 V.

The input terminal 11 is further connected to the anode of a diode 22. The diode 22 is biased in reverse direction by a voltage $U_1$ provided by a second voltage source 23. In a specific embodiment the voltage $U_1$ is about 4.9 V and the turn-on voltage $U_d$ of the diode 22 is 0.6 V.

In consequence, the diode 22 becomes conducting when the colour input signal $U_{in}(R)$ exceeds 5.5 V and hence effectively limits the maximum level of the input signal. The dimensions of the circuit and in particular the amount of feedback are selected such that the amplifier 14 does not reach saturation. Smear effects on the screen are consequently avoided.

Figure 3:
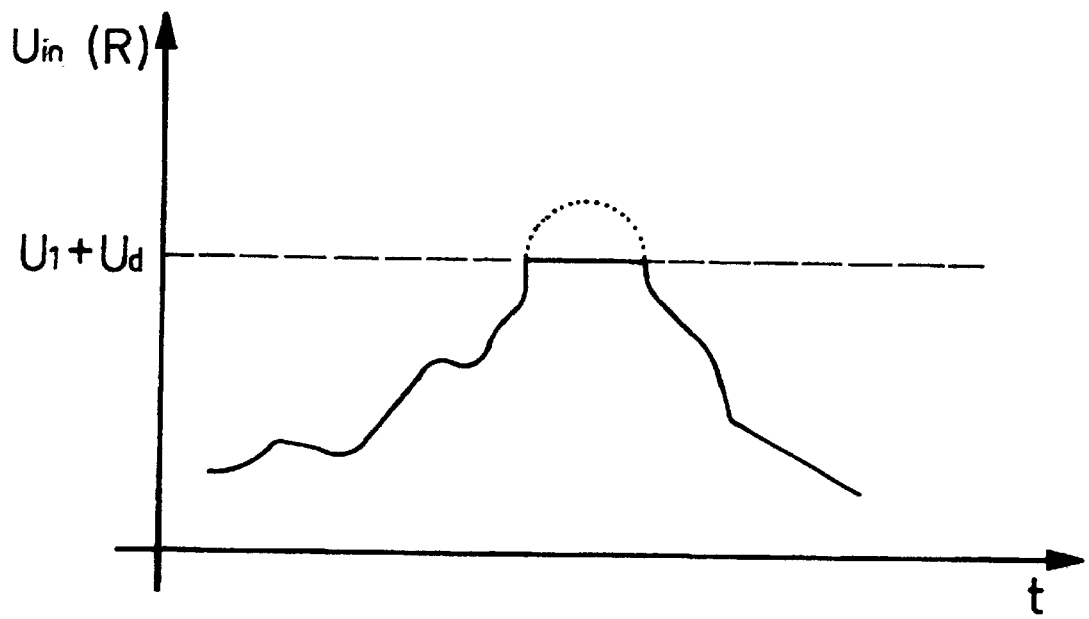
FIG. 3 a curve illustrating the effect of the inventive circuit on the input colour signals.

In FIG. 3 the effect of the inventive circuit on the input signal $U_{in}(R)$ is visualized. The maximal amplitude of the input signal $U_{in}(R)$ is limited to a threshold voltage of $U_1+U_d$, which is the bias voltage of the second voltage source 23 and the turn-on voltage of the diode 22. The threshold voltage is represented by a dashed line in FIG. 3. The curve the input signal would follow without limitation by diode 22 is indicated with a dotted line. It is understood that the input signal $U_{in}(R)$ is representative for all other input signals $U_{in}(G)$, $U_{in}(B)$.

Figure 4:
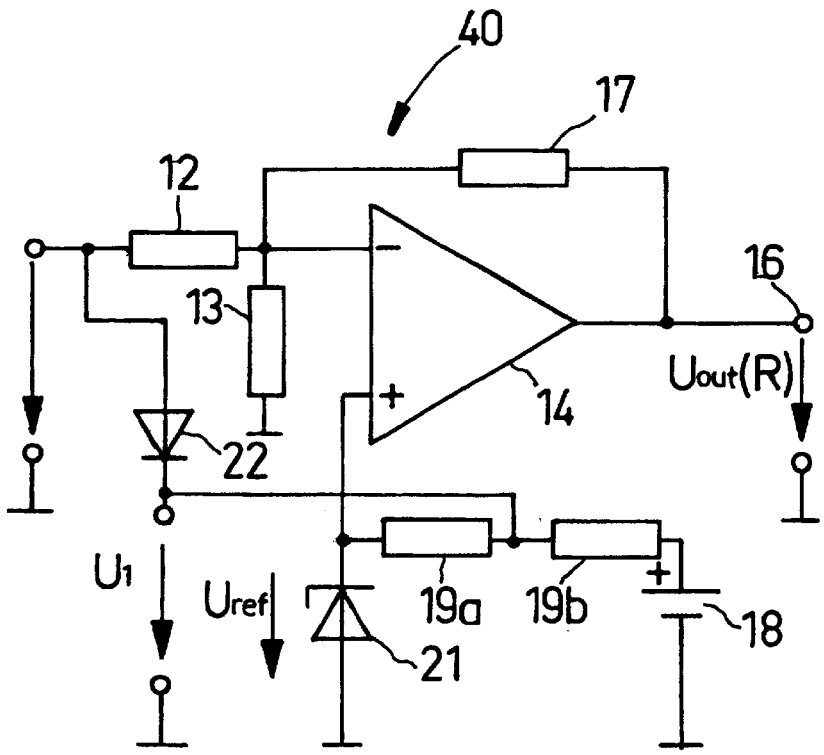
FIG. 4 a schematic circuit diagram of a second embodiment of the inventive circuit.

FIG. 4 shows a second embodiment of the inventive circuit, which is identified as a whole with the reference symbol 40. Corresponding components and elements are identified with the same or corresponding reference symbols.

Contrary to the circuit 10 shown in FIG. 2 in circuit 40 the voltage source 18 is also used to supply the bias voltage $U_1$ for the diode 22. To enable this, the cathode of diode 22 is tapped to a series connection of resistors 19a, 19b essentially replacing the resistor 19 of circuit 10. The resistors 19a and 19b are selected such that diode 22 is biased in reverse direction by a voltage $U_1$, similar to the configuration in FIG. 2.

The limiting voltage in this embodiment is derived from the same source 18 that supplies the reference voltage. In case the voltage source 18 provides a higher than nominal voltage both the reference voltage $U_{ref}$ and the bias voltage $U_1$ are increasing. A higher reference voltage $U_{ref}$ reduces the output signal $U_{out}(R)$ for a given input signal $U_{in}(R)$. However, if the input signal $U_{in}(R)$ exceeds the threshold voltage $U_1+U_d$, the increased $U_1$ (i.e. $U_1$ is higher than its nominal value) allows a higher maximum input signal level. In this case the two effects are counteracting and the tolerance of the output signal level is reduced compared to the circuit 10.

Figure 5:
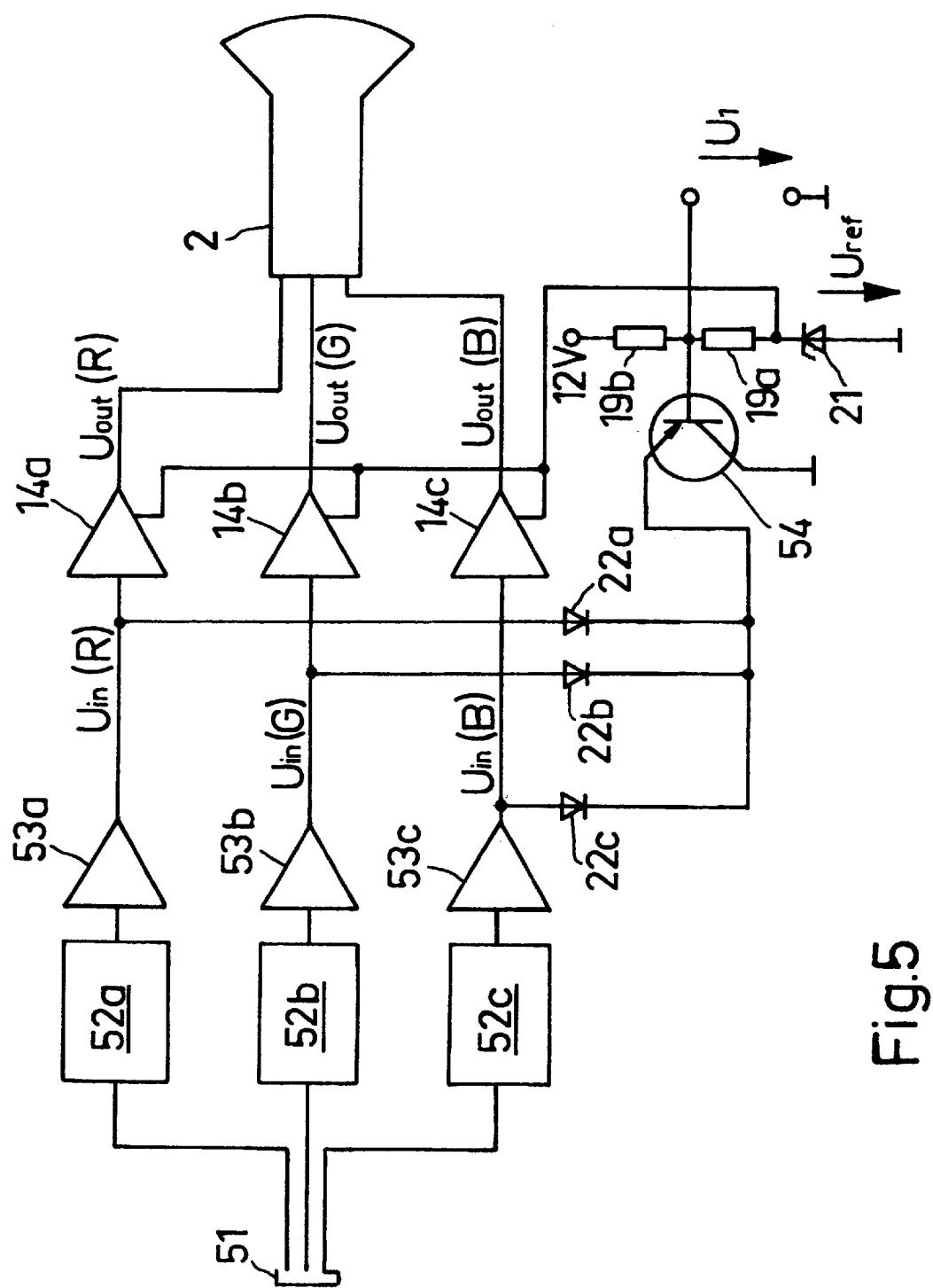
FIG. 5 a schematic circuit diagram of the present invention inside a television receiver.

FIG. 5 displays a further schematic diagram of the inventive circuit emphasizing some other aspects of the invention not shown in FIG. 2 and FIG. 4, but suppressing some details already described there. The video signals for the three primary colours are received from a video processing board (not shown in the drawing) at connector 51. The signals of the primary colours are processed individually in delay lines 52a, 52b, 52c and preamplifiers 53a, 53b, 53c. The output signals of the preamplifiers provide the video input signals $U_{in}(R)$, $U_{in}(G)$, $U_{in}(B)$ for the video end stages 14a, 14b, 14c at their respective inverting inputs.

In one embodiment of the invention the video end stage is the integrated circuit TDA 6111 Q manufactured by Philips. The non-inverting input of the video end stages 14a, 14b, 14c is supplied with a reference voltage $U_{ref}$.

The inverting input of each video end stage 14a, 14b, 14c is connected with the anode of a diode 22a, 22b, 22c, respectively. The cathodes of the diodes 22a, 22b, 22c are connected in parallel with the emitter of a pnp transistor 54. The base of the transistor 54 is biased with a positive voltage $U_1$ taken from a tap of the series connection of resistors 19a, 19b, similar to the configuration displayed in FIG. 4. Hence, the transistor 54 is turned on when the voltage at its emitter exceeds $U_1+U_{be}$ ($U_{be}$=base-emitter voltage of transistor) and operates then as an emitter follower decoupling the diodes 22a, 22b and 22c from the voltage divider 19a, 19b. It is noted that in this particular embodiment of the inventive circuit the video input voltages $U_{in}(R)$, $U_{in}(G)$, $U_{in}(B)$ are limited to a maximum value equal to $U_1+U_{be}+U_d$, where $U_d$ is the diode voltage of the diodes 22a, 22b, 22c.

The skilled person realizes that the presence of transistor 54 is not absolutely necessary. It would also be possible to connect the cathodes of the diodes 22a, 22b and 22c directly to the tap of the voltage divider 19a, 19b. In order to keep the same threshold voltage it would only be necessary to adapt the values of resistors 19a, 19b to compensate for the absence of the base-emitter voltage $U_{be}$. However, this simplification of the circuit would sacrifice the decoupling effect described above.

In another embodiment of the invention not shown in the drawing the diodes 22, 22a, 22b, 22c may be replaced by appropriate transistors. In this case the biasing voltage $U_1$ is used to control the base of the respective transistors to achieve the clipping of the video input signals. Thus, the threshold voltages is $U_1+U_{BE}$.

What we claim is:

1. Circuit for controlling a cathode ray tube including:
   a source of input colour signals for the primary colours of the cathode ray tube,
   an output amplifier having a reference signal input apt for receiving a reference signal, a colour signal input and an output, the colour signal input being coupled to the source of colour input signals and the output being coupled to an electron gun of the cathode ray tube;
   controllable limiting means for limiting the colour input signals to a threshold value being defined by a corresponding control signal, and
   signal generating means for deriving the control signal from the reference signal.

2. Circuit according to claim 1 wherein for each primary colour an output amplifier, controllable limiting means and signal generating means are provided.

3. Circuit according to claim 1, wherein the
   limiting means comprise a diode biased in reverse direction.

4. Circuit according to claim 3 wherein for each primary colour an output amplifier, controllable limiting means and signal generating means are provided.

5. Circuit according to claim 3, wherein the control signal is used to bias the diode in reverse direction.

6. Circuit according to claim 5 wherein for each primary colour an output amplifier, controllable limiting means and signal generating means are provided.

7. Circuit according to claim 1, wherein a single voltage source is utilized to provide the reference signal and the control signal.

8. Circuit according to claim 7 wherein for each primary colour an output amplifier, controllable limiting means and signal generating means are provided.

9. Circuit according to claim 7, wherein
the voltage source for biasing the diode comprises a voltage divider stabilized with a Zener diode.

10. Circuit according to claim 9 wherein for each primary colour an output amplifier, controllable limiting means and signal generating means are provided.

11. Circuit according to claim 7, wherein
a transistor is connected to the limiting means to provide a low impedance signal substantially equal to the control signal in case the input signal exceeds the threshold value.

12. Circuit according to claim 11 wherein for each primary colour an output amplifier, controllable limiting means and signal generating means are provided.

* * * * *